US009014695B2

(12) United States Patent
Brombal et al.

(10) Patent No.: US 9,014,695 B2
(45) Date of Patent: Apr. 21, 2015

(54) METHOD, SERVER AND DATABASE FOR RESOLVING LOCAL DIALING PLANS IN IMS NETWORKS

(71) Applicant: Telefonaktiebolaget LM Ericsson (publ), Stockholm (SE)

(72) Inventors: David Brombal, Plano, TX (US); Pierre Boulos, Richardardson, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 396 days.

(21) Appl. No.: 13/621,912

(22) Filed: Sep. 18, 2012

(65) Prior Publication Data

US 2013/0331095 A1    Dec. 12, 2013

Related U.S. Application Data

(60) Provisional application No. 61/657,961, filed on Jun. 11, 2012.

(51) Int. Cl.
*H04W 4/00* (2009.01)
*H04L 29/06* (2006.01)
*H04W 4/16* (2009.01)

(52) U.S. Cl.
CPC ............ *H04W 4/16* (2013.01); *H04L 65/1016* (2013.01); *H04L 65/1063* (2013.01); *H04L 65/1096* (2013.01)

(58) Field of Classification Search
USPC ............ 455/403, 422.1, 432.1–433; 370/328, 370/351–356, 329
See application file for complete search history.

(56) References Cited

U.S. PATENT DOCUMENTS

| 2007/0060097 | A1* | 3/2007 | Edge et al. ................. 455/404.1 |
| 2008/0285737 | A1* | 11/2008 | Agarwal et al. ............... 379/230 |
| 2009/0191873 | A1* | 7/2009 | Siegel et al. ............... 455/435.2 |
| 2010/0208671 | A1* | 8/2010 | Tamura et al. ................ 370/329 |
| 2012/0188948 | A1* | 7/2012 | Brombal ....................... 370/329 |
| 2012/0287844 | A1* | 11/2012 | Ophir et al. .................... 370/315 |
| 2013/0303161 | A1* | 11/2013 | Miranda et al. ............... 455/433 |

FOREIGN PATENT DOCUMENTS

WO    WO 2009/016967 A1    2/2009

OTHER PUBLICATIONS

Nokia Siemens Networks. Existing IMS Procedures for the Modification of Request URIs to International Format. 3GPP Draft; C3-091363, $3^{rd}$ Generation Partnership Project (3GPP). Oct. 12, 2009.

* cited by examiner

*Primary Examiner* — Ajit Patel

(57) ABSTRACT

A Local Dialing Routing Application Server (LDR-AS) for resolving local dialing plans by a roaming mobile device in regard to a visiting network in which the mobile device is located with a Local Dialing Database (LDD) of the visiting network. The LDR-AS of a home network of the mobile device spatially distinct from the visiting network. Methods for resolving local dialing plans by a roaming mobile device with respect to a visiting network. A Local Dialing Database (LDD) for resolving local dialing plans by a roaming mobile device.

25 Claims, 2 Drawing Sheets

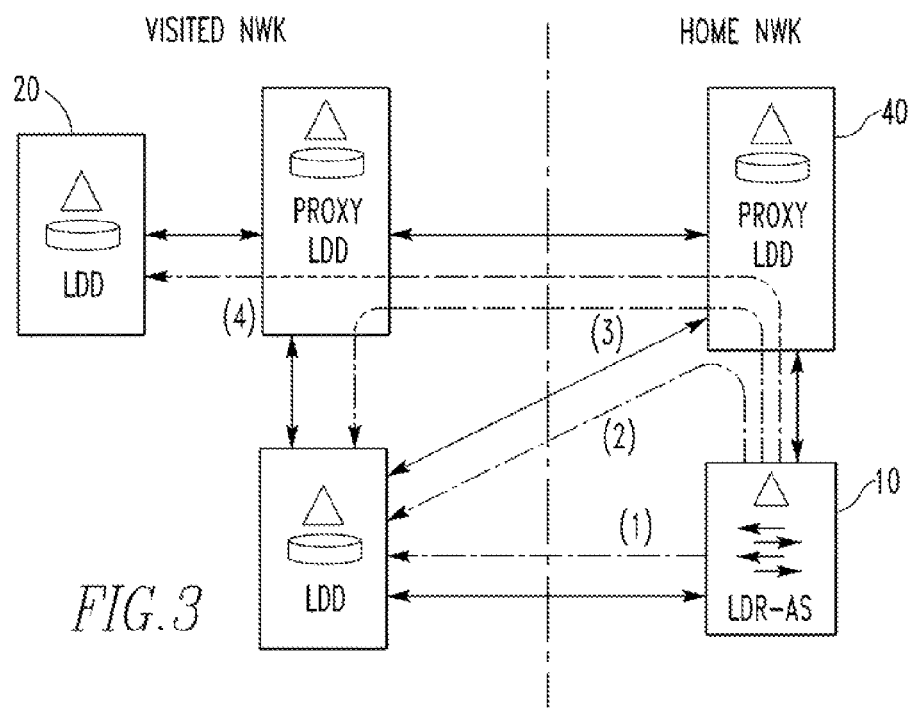
FIG.3
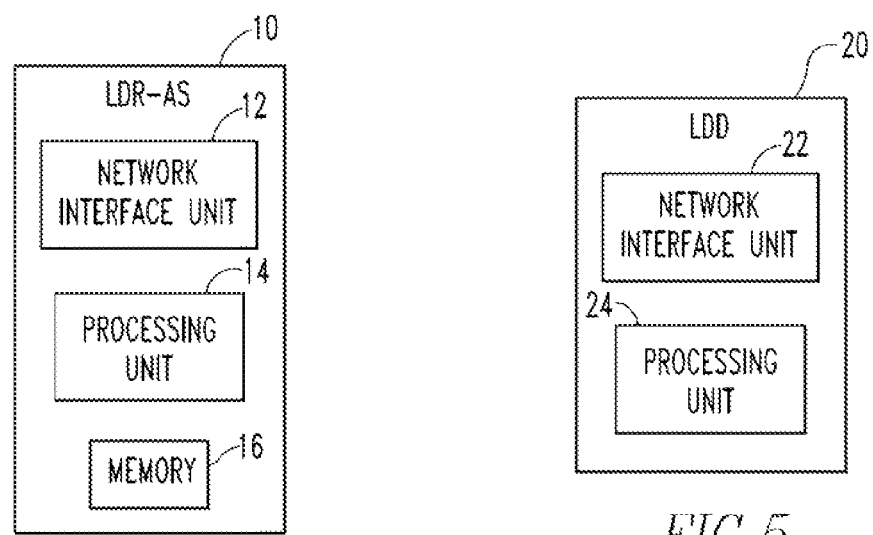
FIG.4
FIG.5

METHOD, SERVER AND DATABASE FOR RESOLVING LOCAL DIALING PLANS IN IMS NETWORKS

CROSS-REFERENCE TO RELATED APPLICATIONS

This application claims priority from U.S. provisional application Ser. No. 61/657,961, incorporated by reference herein.

TECHNICAL FIELD

The present invention is related to resolving local dialing plans by a roaming mobile device in regard to a visiting network in which the mobile device is located. (As used herein, references to the "present invention" or "invention" relate to exemplary embodiments and not necessarily to every embodiment encompassed by the appended claims.) More specifically, the present invention is related to resolving local dialing plans by a roaming mobile device in regard to a visiting network in which the mobile device is located, with a Local Dialing Routing Application Server (LDR-AS) of a home network and a Local Dialing Database (LDD) of the visiting network.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

In most telephone networks, there are examples of telephone numbers that are configured to route calls to that number to different destinations based on where the caller is placing the call from. For example, the common 211 community service code (which connects people with important community services and volunteer opportunities), is intended to route the caller to services that are relevant to the location they are calling from in other cases, there are numbers that are only valid when dialed in limited, areas. For example, dialing *55 from a cell phone in Oklahoma will deliver the caller to highway emergency assistance, whereas in Texas *377 must be used. These are examples of Geo-Local numbers: Telephone numbers that are only valid, or perhaps have different target destinations, when called from specific geographic areas. There are many other examples of such geo-local services (411, *pizza, etc.).

In the IP Multimedia System (IMS), the network architecture is such that when a subscriber roams to another network, network elements belonging to the visited network handle some portions of the call control, while other network elements, located in the subscriber's home network, provide other portions of the call control. The architecture has been defined such that the network elements that are to analyze the dialed digits and provide routing functions are in the user's home network. This is largely done for consistency, so that services and their interactions, such as call forwarding, call transfer, call waiting, etc. work consistently regardless of where the user is roaming.

As described, in the IP Multimedia System (IMS), services and routing decisions are handled in the user's home network. However, when a user roams to another geographic area, their home network will likely not understand how to properly route calls made to geo-local numbers from another location. In the example provided above, the home network would need to have a database that mapped all of the Oklahoma highway assistance centers, their full local routing numbers, and all of the geographic boundaries defined for each of them. It would need the same database for Texas, California, Nevada, etc. This gets even more difficult if you consider a roamer visiting Oklahoma whose home network is in Sweden.

There are two problems that need to be addressed. The first is obviously scaling. It becomes quickly unmanageable if each network provider that supports subscribers roaming to foreign 'partner' networks needs to maintain a database of the geo-local numbers and the resolution/translation rules for each partner. Secondly, there may be problems related to information integrity and security. Partner networks may not wish to provide their mutable access numbers for each of these services to other network providers.

BRIEF SUMMARY OF THE INVENTION

The present invention pertains to an LDR-AS for resolving local dialing plans by a roaming mobile device in regard to a visiting network in which the mobile device is located with an LDD of the visiting network, the LDR-AS of a home network of the mobile device spatially distinct from the visiting network. The LDR-AS comprises a network interface of the LDR-AS which receives from the roaming mobile device a Geo-local request associated with a call by the mobile device to a local number in the visiting network in which the mobile device is located. The request includes information identifying the visiting network. The LDR-AS comprises a processing unit of the LDR-AS which forms a query to determine the call's destination in the visiting network which is sent through the network interface to the LDD. The network interface receiving a message from the LDD with information to complete the call in the visiting network.

The present invention pertains to a method for resolving local dialing plans by a roaming mobile device with respect to a visiting network in which the mobile device is located by an LDD of the visiting network and an LDR-AS of a home network of the mobile device spatially distinct from the visiting network. The method comprises the steps of receiving at a network interface of the LDR-AS from the roaming mobile device a Geo-local request associated with a call by the mobile device to a local number in the visiting network in which the mobile device is located. The request includes information identifying the visiting network. There is the step of forming with a processing unit of the LDR-AS a query to determine the call's destination in the visiting network which is sent through the network interface to the LDD. There is the step of receiving at the network interface a message from the LDD with information to complete the call in the visiting network.

The present invention pertains to a method for resolving local dialing plans by a roaming mobile device with respect to a visiting network in which the mobile device is located by an LDD of the visiting network and an LDR-AS of a home network of the mobile device spatially distinct from the visiting network. The method comprises the steps of receiving at a network interface unit of the LDD a query from the LDR-AS to determine a call's destination in the visiting network. The call by the roaming mobile device to a local number in the visiting network in which the mobile device is located having a Geo-local request associated with the call. There is the step of forming with a processing unit of the LDD a message with information to complete the call in the visiting network.

There is the step of sending from the network interface unit of the LDD the message with information to complete the call to the LDR-AS.

The present invention pertains to an LDD for resolving local dialing plans by a roaming mobile device in regard to a visiting network in which the mobile device and the LDD is located along with an LDR-AS of a home network of the mobile device spatially distinct from the visiting network. The LDD comprises a network interface unit of the LDD which receives a query from the LDR-AS to determine a call's destination in the visiting network. The call by the roaming mobile device to a local number in the visiting, network in which the mobile device is located having, an associated Geo-local request associated with the call. The LDD comprises a processing unit of the LDD which forms a message with information to complete the call in the visiting network and sends the message from the network interface unit to the LDR-AS.

BRIEF DESCRIPTION OF THE DRAWING

In the accompanying drawings, the preferred embodiment of the invention and preferred methods of practicing the invention are illustrated in which:

FIG. 3 shows a proxy LDD topology in regard to the present invention.

FIG. 4 is a block diagram of the LDR-AS of the present invention.

FIG. 5 is a block diagram of the LDD of the present invention.

DETAILED DESCRIPTION

Figure 1:
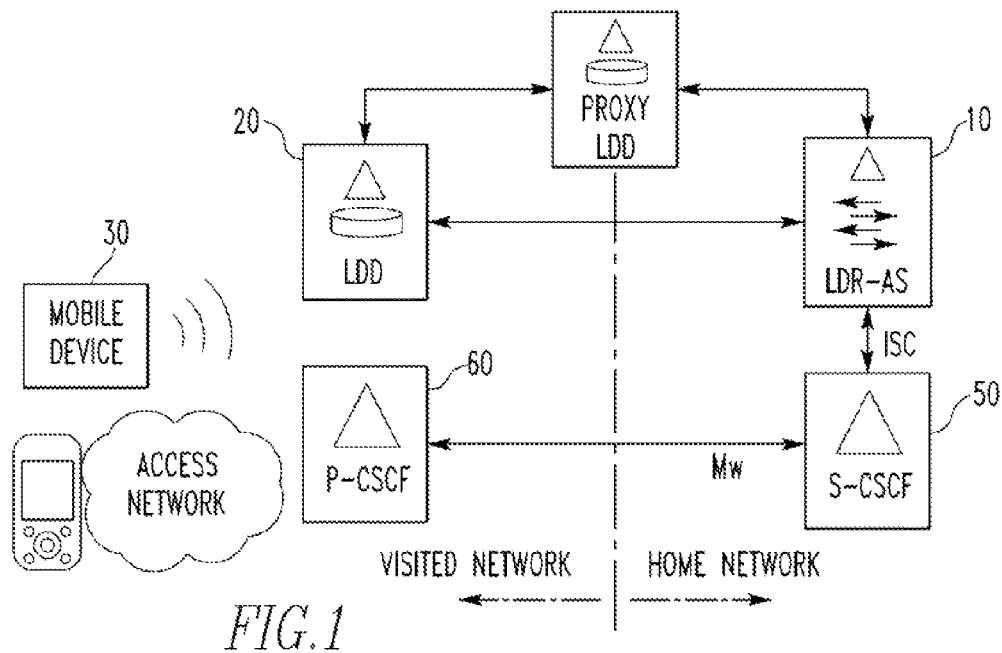
FIG. 1 shows a Geo-local routing network element overview of the present invention.

Referring now to the drawings wherein like reference numerals refer to similar or identical parts throughout the several views, and more specifically to FIG. 4 thereof, there is shown an LDR-AS 10 for resolving local dialing plans by a roaming mobile device 30 in regard to a visiting network in which the mobile device 30 is located with an LDD 20 of the visiting network, the LDR-AS 10 of a home network of the mobile device 30 spatially distinct from the visiting network. The LDR-AS 10 comprises a network interface of the LDR-AS 10 which receives front the roaming mobile device 30 a Geo-local request associated with a call by the mobile device 30 to a local number in the visiting network in which the mobile device 30 is located. The request includes information identifying the visiting network. The LDR-AS 10 comprises a processing unit 14 of the LDR-AS 10 which forms a query to determine the call's destination in the visiting network which is sent through the network interface to the LDD 20. The network interface receiving a message from the LDD 20 with information to complete the call in the visiting network.

The network interface unit 12 may send a complete-call message to complete the call to the call's destination in the visiting network. The processing unit 14 may obtain an address for the LDD 20 from a memory 16 of the LDR-AS 10. The processing unit 14 may form the query to include address data and location data associated with the geo-local request received from the mobile device 30. The network interface unit 12 may receive the message from the LDD 20 which includes an updated Request-URI in regard to the Geo-local request or an address parameter with associated formatting information for the processing unit 14 to know how to use the address parameter.

The processing unit 14 may obtain the address for the LDD 20 from the memory 16 which also has codes for networks, including a code for the visiting network. The Geo-local request from the mobile device 30 may include an SIP request that has at least one PANI value having the location data. The processing unit 14 may obtain an address for the LDD 20 via local proxy in the home network that has the address of the LDD 20.

The present invention pertains to a method for resolving local dialing plans by a roaming mobile device 30 with respect to a visiting network in which the mobile device 30 is located by an LDD 20 of the visiting network and an LDD-AS 10 of a home network of the mobile device 30 spatially distinct from the visiting network. The method comprises the steps of receiving at a network interface of the LDR-AS 10 from the roaming mobile device 30 a Geo-local request associated with a call by the mobile device 30 to a local number in the visiting network in which the mobile device 30 is located. The request includes information identifying the visiting network. There is the step of forming with a processing unit 14 of the LDR-AS 10 a query to determine the call's destination in the visiting network which is sent through the network interface to the LDD 20. There is the step of receiving at the network interface a message from the LDD 20 with information to complete the call in the visiting network.

There may be the step of a sending a complete-call message front the network interface unit 12 to complete the call to the call's destination in the visiting network. There may be the step of the processing unit 14 obtaining an address for the LDD 20 front a memory 16 of the LDR-AS 10. There may be the step of forming the query to include address data and location data associated with the geo-local request received from the mobile device 30.

The receiving of the message from the LDD 20 step may include the step of the network interface unit 12 receiving the message from the LDD 20 which includes an updated Request-URI in regard to the Geo-local request or an address parameter with associated formatting information for the processing unit 14 to know how to use the address parameter. The step of the processing unit 14 obtaining the address for the LDD 20 from the memory 16 may include the step of the processing unit 14 obtaining the address for the LDD 20 from the memory 16 which also has codes for networks, including a code for the visiting network. The step of receiving the Geo-local request from the mobile device 30 may include the step of receiving a SIP request that has at least one P-Access-Network (PANI) value having the location data.

The present invention pertains to a method for resolving local dialing plans by a roaming mobile device 30 with respect to a visiting, network in which the mobile device 30 is located by an LDD 20 of the visiting network and an LDR-AS 10 of a home network of the mobile device 30 spatially distinct from the visiting network. The method comprises the steps of receiving at a network interface unit 22 of the LDD 20 a query from the LDR-AS 10 to determine a call's destination in the visiting network. The call by the roaming mobile device 30 to a local number in the visiting network in which the mobile device 30 is located having a Geo-local request associated with the call. There is the step of forming with a processing unit 24 of the LDD 20 a message with information to complete the call in the visiting network. There is the step of sending from the network interface unit 22 of the LDD 20 the message with information to complete the call to the LDR-AS 10.

The forming step may include the step of forming the message with the processing unit 24 so the message includes an updated Request-URI in regard to the Geo-local request or an address parameter with associated formatting information for the LDR-AS 10 to know how to use the address parameter. The forming step may include the steps of identifying with the processing unit 24 an MSC and a 2G cell, and coming an intermediate message to the MSC with the dialed digits and 2G cell identifier. There may be the step of sending to an MSC 70 a request having dialed digits and a 2G cell identifier. There may be the step of the network interface unit 22 receiving a temporary local directory number from an MSC 70.

The present invention pertains to an LDD 20, as shown in FIG. 5, for resolving local dialing plans by a roaming mobile device 30 in regard to a visiting network in which the mobile device 30 and the LDD 20 is located along with an LDR-AS 10 of a home network of the mobile device 30 spatially distinct from the visiting network. The LDD 20 comprises a network interface unit 22 of the LDD 20 which receives a query from the LDR-AS 10 to determine a call's destination in the visiting network. The call by the roaming mobile device 30 to a local number in the visiting network in which the mobile device 30 is located having an associated Geo-local request associated with the call. The LDD 20 comprises a processing unit 24 of the LDD 20 which forms a message with information to complete the call in the visiting network and sends the message from the network interface unit 22 to the LDR-AS 10.

The processing unit 24 may form the message so the message includes an updated Request-URI in regard to the Geo-local request or an address parameter with associated formatting information for the LDR-AS 10 to know how to use the address parameter. The processing unit 24 may identify an MSC and a 2G cell, and form an immediate message to the MSC with the dialed digits and 2G cell identifier that represents a same geographic area as the location data provided by the call. The network interface unit 22 may send to an MSC 70 a request having dialed digits and a 2G cell identifier. The network interface unit 22 may receive a temporary local directory number from an MSC 70.

In the operation of the invention, for IMS Service Providers & Operators who need to provide geo-local dialing services for roamers in other IMS networks, this method for resolving local dialing plans in IMS Networks provides a solution comprising an IMS Application Server, a distributed set of databases and a standardized interface between them. It provides specific routing information to the Home IMS system when its users are roaming in another operator's network.

Unlike custom or localized solutions that may only work in one operators' network, or between a particular pair of networks, this solution resolves the issue for all situations, such as intra-operator or inter-operator, and interworks with IMS and traditional telephony networks.

The use of an Application Server (AS) in the home network to help resolve geo-local routing is not new. This invention starts with this as a base, defining an AS (referred to here as the Local Dialing Routing-Application Server (LDR-AS) 10 and then introduces the concept of a new entity, an example being the Local Dialing Database (LDD) 20), coupled with methods to be employed in and between these that provide the following:

actions to be taken by the LDR-AS 10 to identify the network serving the user,
defining an additional server (described as the LDD 20 here) that is located in the visited network,
identifying interface methods between the LDD 20 and the Home network's AS, and
identifying an additional, optional, subtending interface between the LDD 20 and legacy (2G or 3G) Mobile Switching Centers (MSC) 70 in the visited network which can be used to augment the LDD 20 function.

The invention has the following characteristics:

As IMS networks begin to roll out, the issue of geo-local numbers will become more apparent. There is the opportunity to encourage adoption of the approach through standardization efforts and working internally to promote availability of an Ericsson product While not necessarily requiring the enhancement of existing standards, since the invention is most useful in inter-operator situations, inclusion of the architecture and recommended interface protocols in standards would be beneficial, and likely preferred by prospective operators. There has not been any activity yet by the authors to introduce the concepts here to standards.

Alternative approaches may be possible. However one approach, whereby gee-local numbers are recognized and altered in the visited network by the P-CSCF 60 (circumventing the need for Home network handling) has already been filed by Ericsson. In addition, it is recognized that ENUM is available as a general E.164 (telephone) number to SIP address translation function. However, it is believed this approach will suffer from the same "Existing Solutions" problem described wherein it would be accessed by the home network and need to have been provisioned with entries from all possible visited networks.

The following description is provided as a possible embodiment, and refers to some elements that are typical of CDMA networks However, the concepts must be recognized as applicable to any type of radio network (GSM, UNITS, WLAN/WiFi, etc.), or wireline networks where the subscriber is allowed some level of "nomadic" attachment by moving their set to an attachment point in another network while maintaining their identity and home network provided services.

Referring, to FIG. 1, this invention is supported by two key network elements:

LDR-AS 10: The Local Dialing Routing Application Server, which would provide a standardized IMS Service Control (ISC) interface to the S-CSCF 50.

LDD 20: The Local Dialing Database (LDD) 20, which is a service entity that resides in the network serving the visiting/roaming subscriber, and is able to provide the local routing information. The LDR-AS 10 interacts with the LDD 20 element to acquire the Routing information. The interface, between the LDR-AS 10 and the LDD 20 is envisaged as a SIP-based interface.

FIG. 1: Geo-Local Routing Network Element Overview

The basic steps involved in resolving a geo-local call are as follows:

1. A mobile (or User Equipment (UE)) roaming in the visited network makes a VoLTE/IMS call to a geo-local number (e.g. 411). The UE forms a geo-local Request-URI and sends a SIP Invite towards the S-CSCF 50 in its Home network. The S-CSCF 50 will have a generic initial filter criterion (iFC) that detects neo-local Request-URIs and invokes the LDR-AS 10 to determine routing. These steps conform to normal 3GPP/3GPP2 IMS procedures.

The format for geo-local Request-URIs is specified in TS24.229, §5.1.2. The UE is configured to recognize when numbers are geo-local (i.e. not in international format, or not matching local rules in the home network, etc.). In such cases a phone-context parameter is added that includes the visiting MCC (Mobile Country Code) and NTNC (Mobile Network Code) and an indication of the access technology ("eps", "gprs", etc.). The HE will obtain these values from the parameters of the radio access network (RAN) that it is attached to.

E.g.: Tel:411;phone-context-311,480,eps.homenet1.com (representing the USA [311] and the Verizon LIE network [480]).

Note that service numbers such as 411 have been used as an example. However it is possible than any dialed number might be handled by this solution. That is, any number dialed that is in a format other than a full national or international number may be a gee-local candidate. As indicated, it is only necessary that the phone has sonic means of identifying gee-local numbers from those representing normal national/international formats etc. These geo-local numbers could be other "short number codes", or perhaps Free-phone e.g., 1-800 numbers) which are relevant and translatable only in the visited network.

2. The LDR-AS 10 uses the Phone-Context parameter in the Request-URI to determine where the call originated (e.g. VzW in the USA). It maintains a list of Country and Network codes for networks for which roaming agreements are in place. For each of these networks, it will keep the address of one or more LDD 20 servers (e.g. a Primary and a Secondary server). The LDR-AS 10 sends a query to the LDD 20 address provisioned for this carrier.

The request sent to the LDD 20 will include at least two key pieces of information derived from the incoming SIP request:

a) The address data from the Request-URI or SIP To: header, and b) Location data from the P-Access-Network-Info (PANI) header.

Details of the PANI header format are given in TS24.229 §7.2A.4, it includes information on the Access Type (e.g. "3GPP-E-UTRAN-FDD") and Access-Info (e.g. "utran-cell-id-3gpp=xxxxxxx"). The cell ID is further described to include the MCC, MNC, TAC (a 16 bit Tracking Area Code within that network) and a Cell Global identity which identifies the specific cell site within that network.

Note that it may be useful for the LIE to include more than one PANI value in its SIP request. This would be in cases where it is aware of multiple access networks at its location—e.g. an LTE network and a WiFi network. The inclusion of more than one PANE is non-standard, and would either need to be done with mutual agreement of the involved vendors/operators, or introduced into relevant standards.

As an alternative to or in addition to, any additional PANI header, the UE may include other headers that would help provide location information. SIP provides headers such as P-Network-ID, Geopriv, and Geolocation headers that can augment the location data provided by the PANI header that must always be inserted by the UE.

In addition to location information, the user may also include additional headers in the request, such as the "accept-language" header. This can help in making a selection from a set of multiple possible answering points, providing the one that is more likely to be able to answer/interact in the indicated language.

3. The LDD 20 evaluates the full information in PANT, language, etc. From this it can determine the geo-local digits that were dialed (e.g. directory assistance—411), the caller's geographic location (e.g. Dallas) and preferred language etc. Since the LDD 20 belongs to the local (visited) network, it will be able to have appropriate access to the translation data of that network. It uses the above information to determine the appropriate destination for the call. Ideally, it will be able to format an IMS routable SIP URI or perhaps a Public Service Identity for the call (ex: 411-Dallas@VZW.com). The response from the LDD 20 must include:

a) an updated Request-URI for use by the LDR-AS 10, or b) an address parameter with associated formatting information to let the LDR-AS 10 know how to use the address in its response to the S-CSCF 50.

Other information may also be returned along with the necessary routing information (e.g. billing or charging related data) as agreed between the operating partners.

4. The LDR-AS 10 is able to create an updated Request-URI using the information from the LDD 20. It then returns the Invite, with the modified Request-URI, hack to the S-CSCF 50.

5. The S-CSCF 50 is able to use normal IMS routing procedures to resolve the Request-URI and begin the process of terminating the call towards the destination that is back in the visited network.

Non-Dialable Destinations:

The above steps assume that the destination can be reached using a SIP URI or an IMS Public Service Identifier (PSI). However, it is possible, particularly in early transitional networks, that this will not be the case. An obvious approach in this case is to provide an international format PSTN number (e.g. +1-972-555-1111).

There are also cases in which geo-local services are provided via the local serving switches and the destination does not have a publically mutable (e.g. non-dialable) access number. One example might be the 611 repair service that routes the caller to a dedicated trunk on the serving switch but does not allow the service to be called directly via an external number.

Figure 2:
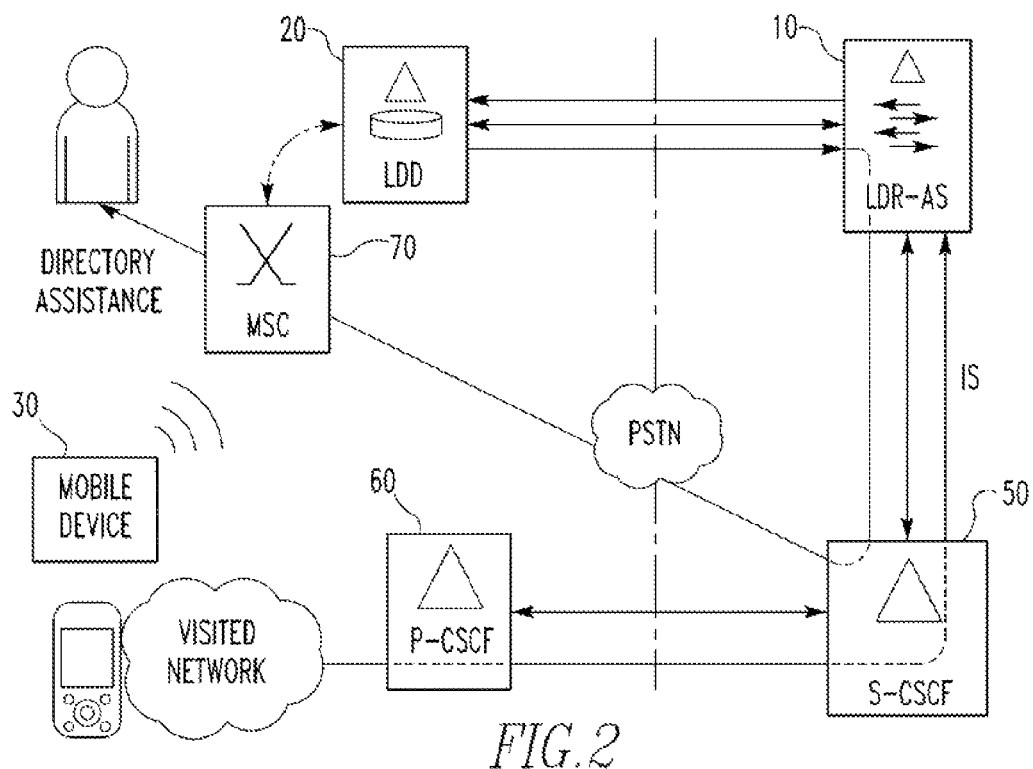
FIG. 2 is a block diagram regarding an interface and the LDD and 2G-3G MSCs in the visited network in regard to the present invention.

This disclosure defines an interface between the LDD 20 and 2G/3G MSCs in the visited network to address these non-dialable situations. This is shown in FIG. 2 which augments the previous figure's topology.

The steps involved in using this interface are as follows:

1. The LDD 20 uses the Request-URI and PANE information provided from the LDR-AS 10 as before. However in this case it would not resolve to an address for the destination (in PSI/URI or E.164.PSTN format). Instead it identifies an MSC 70 and 2G cell identifier that represent the same geographic area as the cell that was provided by the caller via the PANI. This mapping would be configured and provisioned on the LDD 20 by the network owner.

2. The LDD 20 uses an interface to the particular MSC 70 identified by this mapping, and sends it a request containing the dialed digits and the identified 2G cell identifier.

3. The MSC 70 uses similar translation capabilities to those used for normal originations on the switch. It assumes a caller in the identified cell has called the geo-local number and determines what handling would be provided. It then allocates the equivalent of a TLDN (Temporary Local Directory Number), and saves the routing decision against this value. (Alternatively it could save the dialed digits and the cell ID and do the resolution when the TLDN returns). The MSC 70 provides a response to the LDD 20 that includes the TLDN.

4. The LDD 20 creates the same response it would have created in the original case, only it use this TLDN rather than a number it identified itself Either the MSC 70 or the LDD 20 must ensure that the TLDN is provided in a full International format that allows routing regardless of where in the world the request came from.

5. The home network will route the IMS call toward the destination indicated by the TLDN. In this case it will breakout to the PSTN and the call will route towards the switch that issued the TLDN.

6. When the call to the TLDS arrives back at the issuing switch, it will retrieve the saved destination trunk or port it had determined and saved previously (step #3). The call will be routed to this destination, and will not have to have exposed a public address for this service provider. (It may alternately have saved dialed-digit/cell info, and use this to determine the correct routing at this time).

The interface used between the LDD 20 and the MSC 70 could be anything meeting, the needs of the network operator. However, basing, it on ANSI-41 (in the case of CDMA MSCs) is a suggested candidate. The Request could be similar to a Routing Request (ROUTREQ) as defined in X.S0004-540. The invokingresponding Functional Entities would be similar to Case 2 in that specification, supporting VER to Serving MSC 70. (Case 2 supports inclusion of the Location-AreaID parameter, which conveys a Cell ID).

Local Breakout

There is a recognized disadvantage with the use of a PSTN number in an IMS network (for example the use of the TLDN number specified above). These will typically be routed through a breakout function within the home network, then via the international long-distance network. This circumvents the benefits of local breakout, which optimizes the voice path by avoiding looping the path from visited to home and back to the visited network. This can be addressed within the scope of this invention by mechanisms such as the following:

The LDD 20 (or the MSC 70 if involved) encodes the PSTN or TLDN number into a SIP URI by including a visited domain before returning the response to Home LDR-AS 10. This allows the Home IMS network to use IMS routing and not the PSTN to route the call back to the Visited IMS network before any breakout to the PSTN network occurs. PSTN breakout can be avoided altogether if the domain portion is able to direct the signaling directly to the MSC 70, as in many cases the new MSCs are SIP enabled and may act as MGCFs.
E.g.: TLDN@msc23.telco1.com;context=phone, Proxy LDD 40

The network topology being proposed supports the use of Proxy LDD 40 servers as in FIG. 3.

FIG. 3: Proxy LDD 40 Topology

The interfaces between the servers would be used depending on the following configuration considerations:

1. LDR-AS 10 maintains list of foreign LDDs
2. LDR-AS 10 uses a local proxy which keeps the updated LDD list
3. Local proxy does not have access to specific LDDs in foreign networks, just the public proxy for that entire network (reduces N×N mesh)
4. Building on 3, foreign proxy selects one of several possible LDDs based on data in query It is also possible that in certain cases (e.g. for a few "well known" networks), the S-CSCF 50 will have iFC's set up to recognize the need to use specific LDDs. The S-CSCF 50 would then send a request directly to that LDD.

Note that this suggests that use of an ISC interface from the LDR-AS 10 to the LDD 20 would be a good choice. The LDD 20 would not need to know the difference between queries from an LDR-AS 10 and an S-CSCF 50 in this case. However, other interfaces or protocol types are not precluded.

Advantages of the Invention

This invention provides a convenient way for Home network operators to resolve geo-local numbers without having to maintain data for each network that they have a partner arrangement with. This will help encourage quicker adoption of full IMS-interconnect roaming agreements between IMS providers, rather than the current default of PSTN interconnections.

The solution is scalable. Increasing the number of partner networks does not add significantly to the data requirements of the Home network. It only needs to add a route (or a couple) from the LDR-AS 10 to the LDD 20 identified by the partner.

The solution maintains the security and privacy of the addresses in the visited network if desired. The visited network can provide PSI or TLDN values that can prevent the general public from identifying directly dialable numbers.

ABBREVIATIONS

3GPP: 3rd Generation Partnership Program (2)
AS: Application Server
iFC: initial Filter Criteria
IMS: IP Multimedia System
IP: Internet Protocol
LDR-AS: Local Dialing Routing Application Server
LDD: Local Dialing Database
LTE: Long Term Evolution
MCC: Mobile Country Code
MNC: Mobile Network Code
PSTN: Public Switched Telephone Network
P/S-CSCF: Proxy/Serving-Call Session Control Function
SIP: Session Initiation Protocol
TLDN: Temporary Local (or Location) Directory Number
UE: User Equipment
URI: Uniform Resource Identifier
VoLTE: Voice over LTE Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method for resolving local dialing plans by a roaming mobile device with respect to a visiting network in which the mobile device is located by a Local Dialing Database (LDD) of the visiting network and a Local Dialing Routing Application Server (LDR-AS) of a home network of the mobile device spatially distinct from the visiting network, the method comprising the steps of:
   receiving at a network interface of the LDR-AS from the roaming mobile device a Geo-local request associated with a call by the mobile device to a local number in the visiting network in which the mobile device is located, the request includes information identifying the visiting network;
   forming with a processing unit of the LDR-AS a query to determine the call's destination in the visiting network which is sent through the network interface to the LDD; and
   receiving at the network interface a message from the LDD with information to complete the call in the visiting network.

2. The method of claim 1 including the step of a sending a complete-call message from the network interface unit to complete the call to the call's destination in the visiting network.

3. The method of claim 1 including the step of the processing unit obtaining an address for the LDD from a memory of the LDR-AS.

4. The method of claim 1 including the step of forming the query to include address data and location data associated with the gee local request received from the mobile device.

5. The method of claim 1 wherein the receiving of the message from the LDD step includes the step of the network interface unit receiving the message from the LDD which includes an updated Request-URI in regard to the Geo-local request or an address parameter with associated formatting information for the processing unit to know how to use the address parameter.

6. The method of claim 3 wherein the step of the processing unit obtaining the address for the LDD from the memory includes the step of the processing unit obtaining the address for the LDD from the memory which also has codes for networks, including a code for the visiting network.

7. The method of claim 1 wherein the step of receiving the Geo-local request from the mobile device includes the step of receiving a SIP request that has at least one P-Access-Network (PANI) value having the location data.

8. A Local Dialing Routing Application Server (LDR-AS) for resolving local dialing plans by a roaming mobile device in regard to a visiting, network in which the mobile device is located with a Local Dialing Database (LDD) of the visiting network, the LDR-AS of a home network of the mobile device spatially distinct from the visiting network, the LDR-AS comprising:
a network interface of the LDR-AS which receives from the roaming, mobile device a Geo-local request associated with a call by the mobile device to a local number in the visiting network in which the mobile device is located, the request includes information identifying; the visiting network; and
a processing unit of the LDR-AS which forms a query to determine the call's destination in the visiting network which is sent through the network interface to the LDD, the network interface receiving a message from the LDD with information to complete the call in the visiting network.

9. The LDR-AS of claim 8 wherein the network interface unit sends a complete-call message to complete the call to the call's destination in the visiting network.

10. The LDR-AS of claim 8 wherein the processing unit obtains an address for the LDD from a memory of the LDR-AS.

11. The LDR-AS of claim 8 wherein the processing unit forms the query to include address data and location data associated with the geo local request received from the mobile device.

12. The LDR-AS of claim 8 wherein the network interface unit receives the message from the LDD which includes an updated Request-URI in regard to the Geo-local request or an address parameter with associated formatting information for the processing unit to know how to use the address parameter.

13. The LDR-AS of claim 10 wherein the processing, unit obtains the address for the LDD from the memory which also has codes for networks, including a code for the visiting network.

14. The LDR-AS of claim 8 wherein the Geo-local request from the mobile device includes an SIP request that has at least one PANI value having the location data.

15. The LDR-AS of claim 8 wherein the processing unit obtains an address for the LDD from a local proxy in the home network that has the address of the LDD.

16. A method for resolving local dialing plans by a roaming mobile device with respect to a visiting network, in which the mobile device is located by a Local Dialing Database (LDD) of the visiting network and a Local Dialing Routing Application Server (LDR-AS) of a home network of the mobile device spatially distinct from the visiting network, the method comprising the steps of:
receiving at a network interface of the LDD a query from the LDR-AS to determine a call's destination in the visiting network, the call by the roaming mobile device to a local number in the visiting network in which the mobile device is located having an Geo-local request associated with the call;
forming with a processing unit of the LDD a message with information to complete the call in the visiting network; and
sending from the network interface of the LDD the message with information to complete the call to the LDR-AS.

17. The method of claim 16 wherein the forming step includes the step of forming the message with the processing unit so the message includes an updated Request-URI in regard to the Geo-local request or an address parameter with associated formatting information for the LDR-AS to know how to use the address parameter.

18. The method of claim 16 wherein the forming step includes the step of forming the message with the processing unit so the message includes an MSC and 2G cell identifier that represents a same geographic area as the location provided by the call.

19. The method of claim 16 including the step of sending to an MSC a request having dialed digits and a 2G cell identifier.

20. The method of claim 16 including the step of the network interface receiving a temporary local directory number from an MSC.

21. A Local Dialing Database (LDD) for resolving local dialing plans by a roaming mobile device in regard to a visiting network in which the mobile device and the LOD is located along with a Local Dialing Routing Application Server (LDR-AS) of a home network of the mobile device spatially distinct from the visiting network, the LDD comprising:
a network interface of the LDD which receives a query from the LDR-AS to determine a call's destination in the visiting network, the call by the roaming mobile device to a local number in the visiting network in which the mobile device is located having an associated Geo-local request associated with the call; and
a processing unit of the LDD which forms a message with information to complete the call in the visiting network and sends the message from the network interface to the LDR-AS.

22. The LDD of claim 21 wherein the processing unit forms the message so the message includes an updated Request-UM in regard to the Geo-local request or an address parameter with associated formatting information for the LDR-AS to know how to use the address parameter.

23. The LDD of claim 21 wherein the processing unit forms the message so the message includes an MSC and 2G cell identifier that represents a same geographic area as the location data provided by the call.

24. The LDD of claim 21 wherein the network interface unit sends to an MSC a request having dialed digits and a 2G cell identifier.

25. The LDD of claim 21 wherein the network interface receives a temporary local directory number from an MSC.

* * * * *